United States Patent
Yi et al.

(10) Patent No.: US 10,251,133 B2
(45) Date of Patent: *Apr. 2, 2019

(54) METHOD AND APPARATUS FOR TRANSMITTING POWER HEADROOM REPORT IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,028

(22) Filed: Oct. 18, 2017

(65) Prior Publication Data

US 2018/0063798 A1    Mar. 1, 2018

Related U.S. Application Data

(63) Continuation of application No. 14/912,832, filed as application No. PCT/KR2014/008344 on Sep. 4, 2014, now Pat. No. 9,838,982.

(Continued)

(51) Int. Cl.
*H04W 52/36* (2009.01)
*H04W 52/14* (2009.01)
(Continued)

(52) U.S. Cl.
CPC ...... *H04W 52/146* (2013.01); *H04W 52/281* (2013.01); *H04W 52/34* (2013.01);
(Continued)

(58) Field of Classification Search
CPC . H04W 52/365; H04W 88/06; H04W 52/367; H04W 52/34
See application file for complete search history.

(56) References Cited

U.S. PATENT DOCUMENTS 9,509,483 B2 * 11/2016 Damnjanovic ..... H04W 76/048
9,615,338 B2 *  4/2017 Kim ................... H04W 52/146
(Continued)

FOREIGN PATENT DOCUMENTS

| CN | 101933377 | 12/2010 |
|----|-----------|---------|
| CN | 102083131 | 6/2011 |

(Continued)

OTHER PUBLICATIONS

PCT International Application No. PCT/KR2014/008344, Written Opinion of the International Searching Authority dated Dec. 10, 2014, 1 page.

(Continued)

*Primary Examiner* — Mohammad S Anwar
(74) *Attorney, Agent, or Firm* — Lee Hong Degerman Kang Waimey

(57) ABSTRACT

A method and apparatus for transmitting a power headroom report (PHR) in a wireless communication system is provided. A user equipment (UE) transmits a first PHR for a first carrier group, which is configured by a first eNodeB (eNB), to a second eNB; and transmitting a second PHR for a second carrier group, which is configured by the second eNB, to the first eNB. Te first PHR and the second PHR include a PHR for a physical uplink control channel (PUCCH) regardless of whether simultaneous transmission of the PUCCH and a physical uplink shared channel (PUSCH) is configured or not.

16 Claims, 11 Drawing Sheets

| $C_7$ | $C_6$ | $C_5$ | $C_4$ | $C_3$ | $C_2$ | $C_1$ | R |
|---|---|---|---|---|---|---|---|
| P | V | PH (Type 2, PCell) | | | | | |
| R | R | $P_{CMAX,c}$ 1 | | | | | |
| P | V | PH (Type 1, PCell) | | | | | |
| R | R | $P_{CMAX,c}$ 2 | | | | | |
| P | V | PH (Type 1, SCell 1) | | | | | |
| R | R | $P_{CMAX,c}$ 3 | | | | | |

| P | V | PH (Type 1, SCell n) |
|---|---|---|
| R | R | $P_{CMAX,c}$ m |

Related U.S. Application Data

(60) Provisional application No. 62/034,153, filed on Aug. 7, 2014, provisional application No. 62/033,630, filed on Aug. 5, 2014, provisional application No. 62/015,505, filed on Jun. 22, 2014, provisional application No. 62/014,120, filed on Jun. 19, 2014, provisional application No. 62/009,311, filed on Jun. 8, 2014, provisional application No. 61/984,030, filed on Apr. 24, 2014, provisional application No. 61/981,170, filed on Apr. 17, 2014, provisional application No. 61/976,486, filed on Apr. 7, 2014, provisional application No. 61/943,457, filed on Feb. 23, 2014, provisional application No. 61/940,379, filed on Feb. 15, 2014, provisional application No. 61/938,147, filed on Feb. 11, 2014, provisional application No. 61/927,503, filed on Jan. 15, 2014, provisional application No. 61/873,804, filed on Sep. 4, 2013.

(51) Int. Cl.
| | |
|---|---|
| *H04W 72/04* | (2009.01) |
| *H04W 72/10* | (2009.01) |
| *H04W 52/34* | (2009.01) |
| *H04W 52/28* | (2009.01) |
| *H04L 5/00* | (2006.01) |
| *H04W 52/40* | (2009.01) |
| *H04W 88/06* | (2009.01) |

(52) U.S. Cl.
CPC ....... *H04W 52/346* (2013.01); *H04W 52/365* (2013.01); *H04W 52/367* (2013.01); *H04W 72/0473* (2013.01); *H04W 72/10* (2013.01); *H05K 999/99* (2013.01); *H04L 5/001* (2013.01); *H04W 52/40* (2013.01); *H04W 88/06* (2013.01)

(56) References Cited

U.S. PATENT DOCUMENTS

| | | | | |
|---|---|---|---|---|
| 9,838,982 | B2* | 12/2017 | Yi | ........... H04W 52/365 |
| 2009/0197632 | A1 | 8/2009 | Ghosh et al. | |
| 2011/0292874 | A1* | 12/2011 | Ho | ........... H04W 52/42 370/328 |
| 2011/0310781 | A1 | 12/2011 | Kim et al. | |
| 2012/0040707 | A1 | 2/2012 | Kim et al. | |
| 2012/0044882 | A1 | 2/2012 | Kim et al. | |
| 2012/0113833 | A1* | 5/2012 | Jen | ........... H04L 5/0053 370/252 |
| 2013/0176953 | A1 | 7/2013 | Stern-Berkowitz et al. | |
| 2013/0195048 | A1 | 8/2013 | Ekpenyong et al. | |
| 2015/0029957 | A1* | 1/2015 | Han | ........... H04W 76/02 370/329 |
| 2015/0036566 | A1 | 2/2015 | Blankenship et al. | |
| 2015/0055454 | A1 | 2/2015 | Yang et al. | |
| 2016/0135193 | A1 | 5/2016 | Zhang et al. | |
| 2016/0183290 | A1 | 6/2016 | Ko et al. | |
| 2016/0198421 | A1 | 7/2016 | Yi et al. | |

FOREIGN PATENT DOCUMENTS

| | | |
|---|---|---|
| CN | 102428731 | 4/2012 |
| CN | 102469058 | 5/2012 |
| CN | 102934498 | 2/2013 |
| CN | 103069732 | 4/2013 |
| CN | 103069870 | 4/2013 |
| JP | 2012510785 | 5/2012 |
| JP | 2013519325 | 5/2013 |
| JP | 2017513377 | 5/2017 |
| KR | 10-2012-0001569 | 1/2012 |
| KR | 10-2012-0016987 | 2/2012 |
| KR | 10-2012-0024381 | 3/2012 |
| KR | 10-2012-0103747 | 9/2012 |
| RU | 2011145013 | 5/2013 |
| WO | 2010065759 | 6/2010 |
| WO | 2012062155 | 5/2012 |
| WO | 2013025562 | 2/2013 |
| WO | 2013069746 | 5/2013 |
| WO | 2015153382 | 10/2015 |

OTHER PUBLICATIONS

Russian Federation Federal Service for Intellectual Property, Patents and Trademarks Application Serial No. 2016112307/07, Search Report dated Feb. 15, 2017, 2 pages.
European Patent Office Application Serial No. 14842776.8, Search Report dated Mar. 13, 2017, 8 pages.
Pantech, "Considerations on Scheduler Architecture for dual connectivity", R1-131095, 3GPP TSG RAN WG2 Meeting #81bis, Apr. 2013, 5 pages.
Catt, "Additional Information Report for PHR", R2-106387, 3GPP TSG RAN WG2 Meeting #72, Nov. 2010, 3 pages.
European Patent Office Application Serial No. 14841683.7 Search Report dated Mar. 10, 2017, 8 pages.
U.S. Appl. No. 15/832,659, Office Action dated Mar. 30, 2018, 17 pages.
European Patent Office Application Serial No. 14841683.7 Office Action dated Feb. 16, 2018, 6 pages.
European Patent Office Application Serial No. 14841732.2, Office Action dated Feb. 16, 2018, 6 pages.
Ericsson, et al., "Pcmax with piggy-backed SRS and MTA", 3GPP TSG RAN WG4 Meeting #67, R4-132247, May 2013, 5 pages.
Asustek, "Physical Layer Impacts of Dual Connectivity for Small Cell Enhancement", 3GPP TSG RAN WG1 Meeting #74, R1-133565, Aug. 2013, 3 pages.
State Intellectual Property Office of the People's Republic of China Application Serial No. 201480048814.0, Office Action dated May 2, 2018, 9 pages.
State Intellectual Property Office of the People's Republic of China Application Serial No. 201480048892.0, Office Action dated May 2, 2018, 8 pages.
Japan Patent Office Application No. 2016-540813, Office Action dated Jul. 31, 2018, 2 pages.
Ericsson, et al., "Physical layer aspects of dual connectivity", 3GPP TSG RAN WG1 Meeting #74, R1-133436, Aug. 2013, 3 pages.
Etri, "Physical layers aspects of dual connectivity", 3GPP TSG RAN WG1 Meeting #74, R1-133182, Aug. 2013, 4 pages.
NSN, et al., "PHR for dual connectivity", 3GPP TSG RAN WG2 Meeting #84, R2-140139, Feb. 2014, 7 pages.
The State Intellectual Property Office of the People's Republic of China Application Serial No. 201480055579.X, Office Action dated Aug. 1, 2018, 8 pages.
United States Patent and Trademark Office U.S. Appl. No. 14/913,210, Office Action dated Aug. 30, 2018, 11 pages.
Japan Patent Office Application No. 2016-540812, Office Action dated Sep. 4, 2018, 3 pages.
Japan Patent Office Application No. 2016-540814, Office Action dated Sep. 11, 2018, 4 pages.
NTT DOCOMO, "Outcome of offline discussion on TPC aspects of dual connectivity", BGPP TSG RAN WG1 Meeting #76bis, R1-141863, Apr. 2014, 17 pages.
NTT DOCOMO, "Summary of email discussion [76b-08]", 3GPP TSG RAN WG1 Meeting #77, R1-142263, May 2014, 30 pages.
United States Patent and Trademark Office U.S. Appl. No. 15/994,768, Office Action dated Feb. 8, 2019, 16 pages.

* cited by examiner

FIG. 8

| R | R | PH | Oct 1 |

FIG. 9

| $C_7$ | $C_6$ | $C_5$ | $C_4$ | $C_3$ | $C_2$ | $C_1$ | R |
|---|---|---|---|---|---|---|---|
| P | V | \multicolumn{6}{l}{PH (Type 2, PCell)} |
| R | R | \multicolumn{6}{l}{$P_{CMAX,c}$ 1} |
| P | V | \multicolumn{6}{l}{PH (Type 1, PCell)} |
| R | R | \multicolumn{6}{l}{$P_{CMAX,c}$ 2} |
| P | V | \multicolumn{6}{l}{PH (Type 1, SCell 1)} |
| R | R | \multicolumn{6}{l}{$P_{CMAX,c}$ 3} |

| P | V | PH (Type 1, SCell n) |
|---|---|---|
| R | R | $P_{CMAX,c}$ m |

METHOD AND APPARATUS FOR TRANSMITTING POWER HEADROOM REPORT IN WIRELESS COMMUNICATION SYSTEM

CROSS-REFERENCE TO RELATED APPLICATIONS

This application is a continuation of U.S. patent application Ser. No. 14/912,832, filed on Feb. 18, 2016, now U.S. Pat. No. 9,838,982, which is the National Stage filing under 35 U.S.C. 371 of International Application No. PCT/KR2014/008344, filed on Sep. 4, 2014, which claims the benefit of U.S. Provisional Application No. 61/873,804, filed on Sep. 4, 2013, 61/927,503, filed on Jan. 15, 2014, 61/938,147, filed on Feb. 11, 2014, 61/940,379, filed on Feb. 15, 2014, 61/943,457, filed on Feb. 23, 2014, 61/976,486, filed on Apr. 7, 2014, 61/981,170, filed on Apr. 17, 2014, 61/984,030, filed on Apr. 24, 2014, 62/009,311, filed on Jun. 8, 2014, 62/014,120, filed on Jun. 19, 2014, 62/015,505, filed on Jun. 22, 2014, 62/033,630, filed on Aug. 5, 2014 and 62/034,153 filed on Aug. 7, 2014, the contents of which are all hereby incorporated by reference herein in their entirety.

BACKGROUND OF THE INVENTION

Field of the Invention

The present invention relates to wireless communications, and more particularly, to a method and apparatus for transmitting a power headroom report in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established here one CG can have multiple CCs. Each CC is defined by a single bandwidth and a center frequency.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

The power headroom reporting (PHR) procedure is used to provide the serving eNB with information about the difference between the nominal UE maximum transmit power and the estimated power for uplink shared channel (UL-SCH) transmission per activated serving cell and also with information about the difference between the nominal UE maximum power and the estimated power for UL-SCH and PUCCH transmission on primary cell (PCell). Efficient power headroom reporting method for CA or dual connectivity may be required.

SUMMARY OF THE INVENTION

The present invention provides a method and apparatus for transmitting a power headroom report (PHR) in a wireless communication system. The present invention provides a method for a method for transmitting the same type of PHR for a plurality of carrier groups regardless of whether simultaneous transmission of a physical uplink control channel (PUCCH) and a physical shared channel (PUSCH) is configured or not.

In an aspect, a method for transmitting, by a user equipment (UE), a power headroom report (PHR) in a wireless communication system is provided. The method includes transmitting a first PHR for a first carrier group, which is configured by a first eNodeB (eNB), to a second eNB, and transmitting a second PHR for a second carrier group, which is configured by the second eNB, to the first eNB. The first PHR and the second PHR include a PHR for a physical uplink control channel (PUCCH) regardless of whether simultaneous transmission of the PUCCH and a physical uplink shared channel (PUSCH) is configured or not.

In another aspect, a user equipment (UE) in a wireless communication system is provided. The UE includes a radio frequency (RF) unit for transmitting or receiving a radio signal, and a processor coupled to the RF unit, and configured to transmit a first PHR for a first carrier group, which is configured by a first eNodeB (eNB), to a second eNB, and transmit a second PHR for a second carrier group, which is configured by the second eNB, to the first eNB. The first PHR and the second PHR include a PHR for a physical uplink control channel (PUCCH) regardless of whether simultaneous transmission of the PUCCH and a physical uplink shared channel (PUSCH) is configured or not.

A PHR can be transmitted efficiently.

BRIEF DESCRIPTION OF THE DRAWINGS

FIG. 8 shows a power headroom MAC CE.
FIG. 9 shows an extended power headroom MAC CE.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

Figure 1:
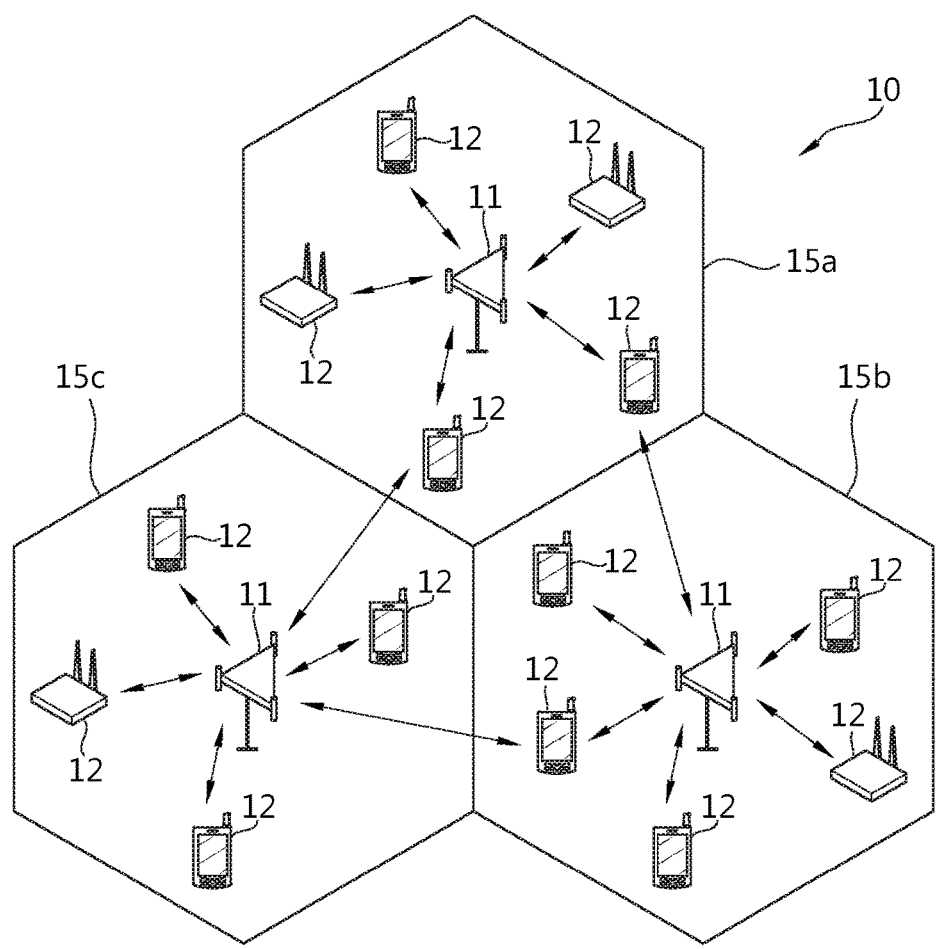
FIG. 1 shows a wireless communication system.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
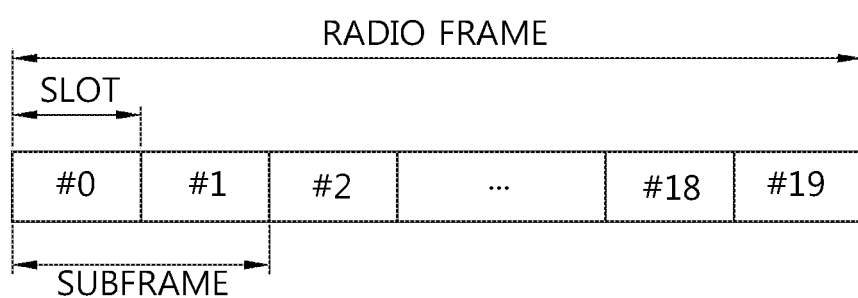
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbols may be called by other names depending on a multiple-access scheme. For example, when SC-FDMA is in use as an uplink multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
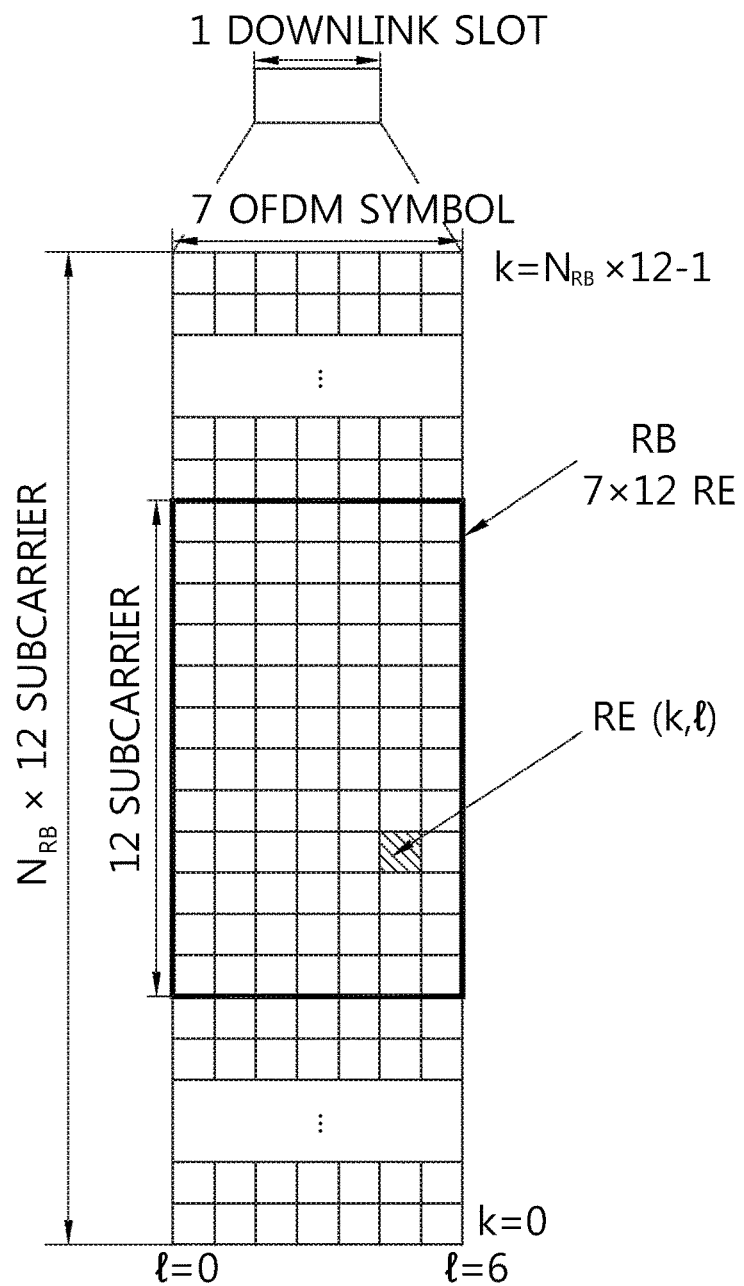
FIG. 3 shows a resource grid for one downlink slot.

FIG. 3 shows a resource grid for one downlink slot. Referring to FIG. 3, a downlink slot includes a plurality of OFDM symbols in time domain. It is described herein that one downlink slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the downlink slot depends on a downlink transmit bandwidth. The structure of an uplink slot may be same as that of the downlink slot.

The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
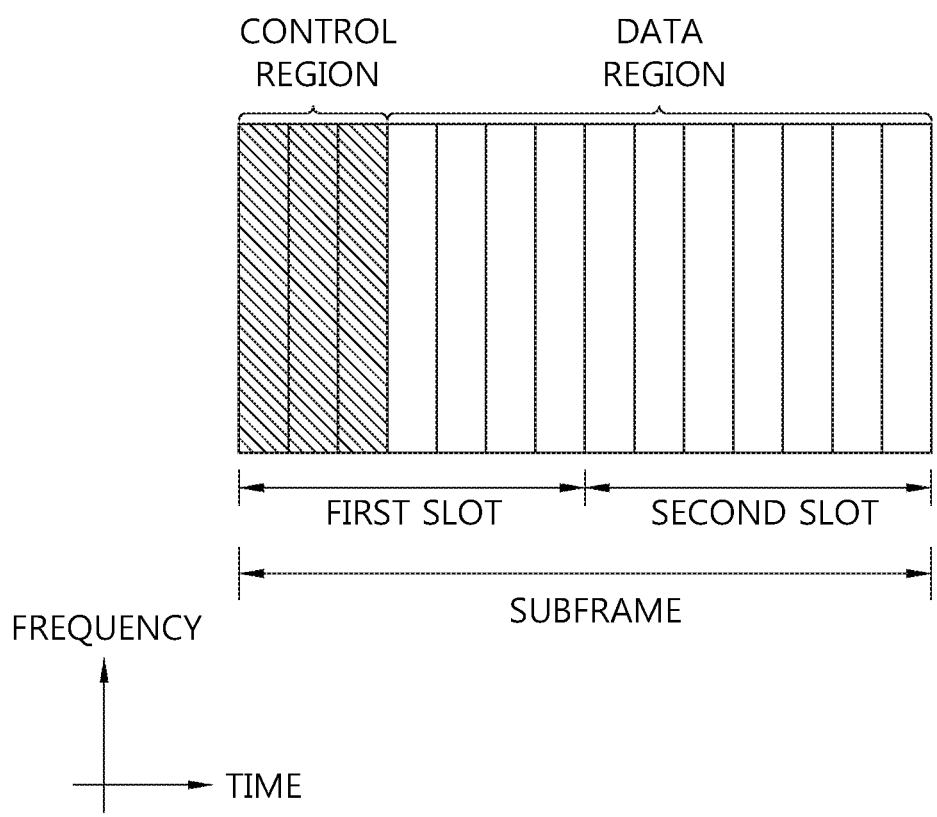
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
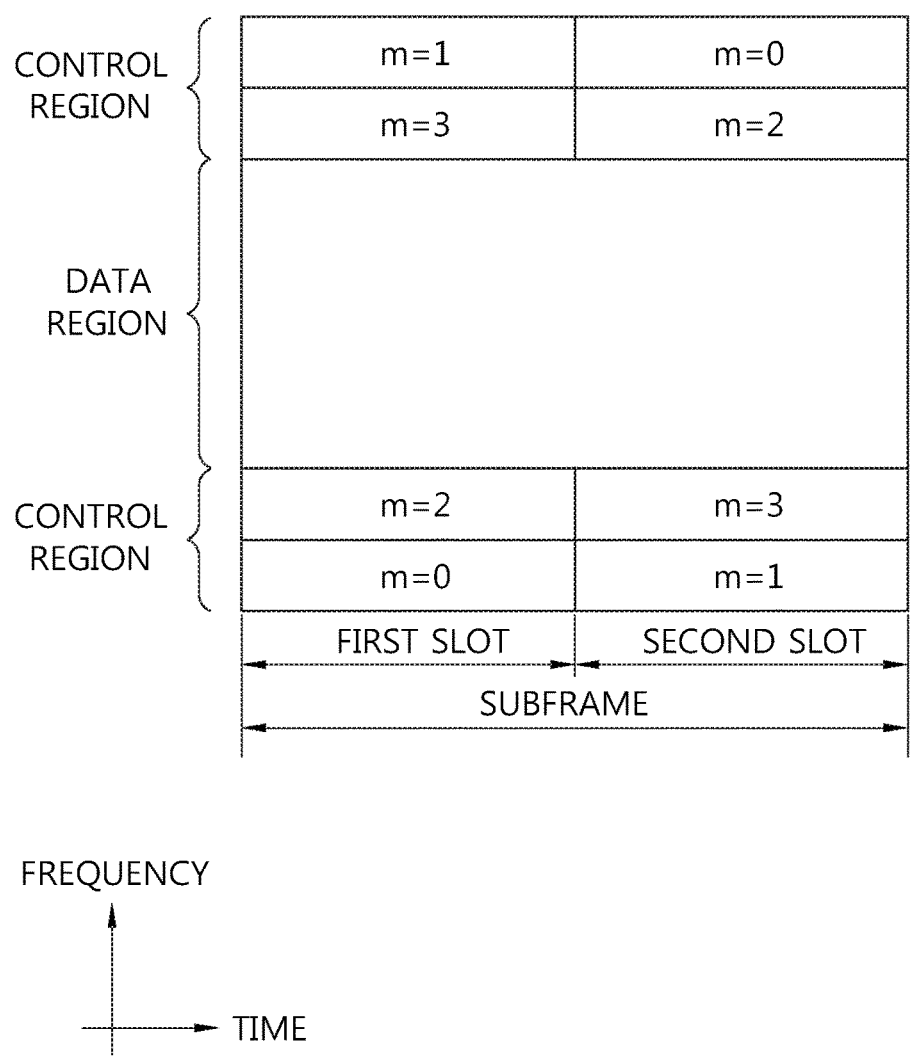
FIG. 5 shows structure of an uplink subframe.

FIG. 5 shows structure of an uplink subframe. Referring to FIG. 5, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting uplink control information through different subcarriers according to time.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Carrier aggregation (CA) is described. It may be referred to Section 5.5 of 3GPP TS 36.300 V11.6.0 (2013-06).

In CA, two or more component carriers (CCs) are aggregated in order to support wider transmission bandwidths up to 100 MHz or more. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 6:
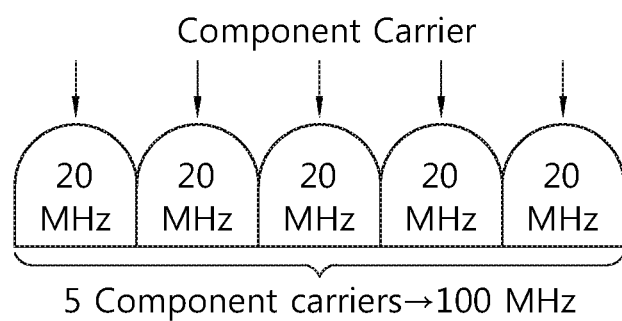
FIG. 6 shows an example of a carrier aggregation of 3GPP LTE-A.

FIG. 6 shows an example of a carrier aggregation of 3GPP LTE-A. Referring to FIG. 6, each CC has a bandwidth of 20 MHz, which is a bandwidth of 3GPP LTE. Up to 5 CCs or more may be aggregated, so maximum bandwidth of 100 MHz or more may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. In typical TDD deployments, the number of CCs and the bandwidth of each CC in UL and DL is the same. A number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Dual connectivity is described.

Figure 7:
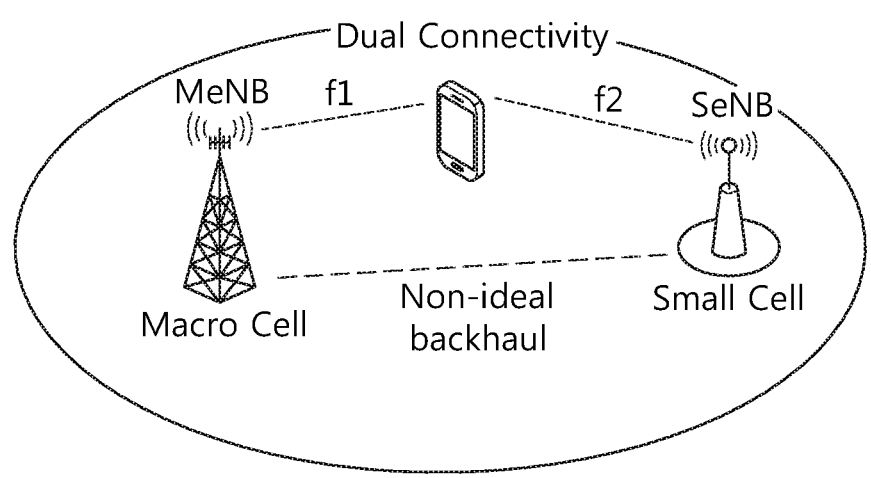
FIG. 7 shows an example of dual connectivity to a macro cell and a small cell.

FIG. 7 shows an example of dual connectivity to a macro cell and a small cell. Referring to FIG. 7, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be generally configured for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms.

Power headroom according to the current specification of 3GPP LTE is described. It may be referred to Section of 5.1.1.2 of 3GPP TS 36.213 V11.3.0 (2013-06). There are two types of UE power headroom reports defined. A UE power headroom is valid for subframe i for serving cell c.

Type 1 power headroom is described. If the UE transmits PUSCH without PUCCH in subframe i for serving cell c, power headroom for a type 1 report is computed using Equation 1.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \; [dB] \quad \text{<Equation 1>}$$

In Equation 1, $P_{CMAX,c}(i)$ is the configured UE transmit power in subframe i for serving cell c. $M_{PUSCH,c}(i)$ is the bandwidth of the PUSCH resource assignment expressed in number of resource blocks valid for subframe i and serving cell c. $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$. $PL_c$ is the downlink pathloss estimate calculated in the UE for serving cell c in dB.

If the UE transmits PUSCH with PUCCH in subframe i for serving cell c, power headroom for a type 1 report is computed using Equation 2.

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \; [dB] \quad \text{<Equation 2>}$$

In Equation 2, $M_{PUSCH,c}(i)$, $P_{O\_PUSCH,c}(j)$, $\alpha_c(j)$, $PL_c$ are defined in Equation 1. $\tilde{P}_{CMAX,c}(i)$ is computed based on the requirements in 3GPP TS 36.101 assuming a PUSCH only transmission in subframe i. For this case, the physical layer delivers $\tilde{P}_{CMAX,c}(i)$ instead of $P_{CMAX,c}(i)$ to higher layers.

If the UE does not transmit PUSCH in subframe i for serving cell c, power headroom for a type 1 report is computed using Equation 3.

$$PH_{type1,c}(i) = \tilde{P}_{CMAX,c}(i) - \{P_{O\_PUSCH,c}(1) + \alpha_c(1) \cdot PL_c + f_c(i)\} \; [dB] \quad \text{<Equation 3>}$$

In equation 3, $P_{CMAX,c}(i)$ is computed assuming maximum power reduction (MPR)=0 dB, additional MPR (A-MPR)=0 dB, power management MPR (P-MPR)=0 dB and $\Delta T_C$=0 dB, where MPR, A-MPR, P-MPR and $\Delta T_C$ are defined in 3GPP TS 36.101. $P_{O\_PUSCH,c}(1)$, $\alpha_c(1)$, $PL_c$ are defined in Equation 1.

Type 2 power headroom is described. If the UE transmits PUSCH simultaneous with PUCCH in subframe i for the primary cell, power headroom for a type 2 report is computed using Equation 4.

$$PH_{type2}(i) = P_{CMAX,c}(i) - 10\log_{10}\left( 10^{\left(10\log_{10}(M_{PUSCH,c}(i)) + P_{O\_PUSCH,c}(j) + \alpha_c(j) \cdot PL_c + \Delta_{TF,c}(i) + f_c(i)\right)/10} + 10^{\left(P_{O\_PUCCH} + PL_c + h(n_{CQI}, n_{HARQ}, n_{SR}) + \Delta_{F\_PUCCH}(F) \Delta_{TxD}(F') + g(i)\right)/10} \right) \; [dB] \quad \text{<Equation 4>}$$

In equation 4, $P_{CMAX,c}(i)$, $M_{PUSCH,c}(i)$, $P_{O\_PUSCH,c}(j)$, $\alpha_c(j)$, $PL_c$ are the primary cell parameters as defined in Equation 1. $P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers. $h(n_{CQI}, n_{HARQ}, n_{SR})$ is a PUCCH format dependent value, where $n_{CQI}$ corresponds to the number of information bits for the channel quality information (CQI). $n_{SR}$=1 if subframe i is configured for SR for the UE not having any associated transport block for UL-SCH, otherwise $n_{SR}$=0=0. The parameter $\Delta_{F\_PUCCH}(F)$ is provided by higher layers. If the UE is configured by higher layers to transmit PUCCH on two antenna ports, the value of $\Delta_{TxD}(F')$ is provided by higher layers. Otherwise, $\Delta_{TxD}(F')$=0.

If the UE transmits PUSCH without PUCCH in subframe i for the primary cell, power headroom for a type 2 report is computed using Equation 5.

< Equation 5 >

$$PH_{type2}(i) = P_{CMAX,c}(i) - 10\log_{10}\left(10^{\left(10\log_{10}(M_{PUSCH,c}(i)) + P_{O\_PUSCH,c}(j) + \alpha_c(j) \cdot PL_c + \Delta_{TF,c}(i) + f_c(i)\right)/10} + 10^{(P_{0\_PUCCH} + PL_c + g(i))/10}\right) \; [dB]$$

In Equation 5, $P_{CMAX,c}(i)$, $M_{PUSCH,c}(i)$, $P_{O\_PUSCH,c}(j)$, $\alpha_c(j)$, $PL_c$ are the primary cell parameters as defined in Equation 1. $P_{O\_PUCCH}$ is defined in Equation 4.

If the UE transmits PUCCH without PUSCH in subframe i for the primary cell, power headroom for a type 2 report is computed using Equation 6.

< Equation 6 >

$$PH_{type2}(i) = P_{CMAX,c}(i) - 10\log_{10}\left(10^{(P_{O\_PUSCH,c}(1) + \alpha_c(1) \cdot PL_c + f_c(i))/10} + 10^{\left(P_{0\_PUCCH} + PL_c + h(n_{CQI}, n_{HARQ}, n_{SR}) + \Delta_{F\_PUCCH}(F) \Delta_{TxD}(F') + g(i)\right)/10}\right) \; [dB]$$

In equation 6, $P_{O\_PUSCH,c}(1)$, $\alpha_c(1)$, PLc are the primary cell parameters as defined in Equation 1. $P_{CMAX,c}(i)$, $P_{O\_PUCCH}$, $h(n_{CQI}, n_{HARQ}, n_{SR})$, $\Delta_{F\_PUCCH}(F)$, $\Delta_{TxD}(F')$ are also defined in Equation 4.

If the UE does not transmit PUCCH or PUSCH in subframe i for the primary cell, power headroom for a type 2 report is computed using Equation 7.

< Equation 7 >

$$PH_{type2}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH} + PL_c + g(i))/10}\right) \; [dB]$$

In Equation 7, $P_{CMAX,c}(i)$ is computed assuming MPR=0 dB, A-MPR=0 dB, P-MPR=0 dB and $\Delta T_C$=0 dB, where MPR, A-MPR, P-MPR and $\Delta T_C$ are defined in 3GPP TS 36.101. $P_{O\_PUSCH,c}(1)$, $\alpha_c(1)$, PLc are the primary cell parameters as defined in Equation 1. $P_{CMAX,c}(i)$, $P_{O\_PUCCH}$, $h(n_{CQI}, n_{HARQ}, n_{SR})$, $\Delta_{F\_PUCCH}(F)$, $\Delta_{TxD}(F')$ are defined in Equation 4.

The power headroom shall be rounded to the closest value in the range [40; −23] dB with steps of 1 dB and is delivered by the physical layer to higher layers.

Power headroom reporting (PHR) is described. It may be referred to Section of 5.4.6 of 3GPP TS 36.321 V11.3.0 (2013-06). Radio resource control (RRC) controls power headroom reporting by configuring the two timers periodicPHR-Timer and prohibitPHR-Timer, and by signalling dl-PathlossChange which sets the change in measured downlink pathloss and the required power backoff due to power management (as allowed by P-MPR$_c$) to trigger a PHR.

A PHR shall be triggered if any of the following events occur:
  prohibitPHR-Timer expires or has expired and the path loss has changed more than dl-PathlossChange dB for at least one activated serving cell which is used as a pathloss reference since the last transmission of a PHR when the UE has UL resources for new transmission;
  periodicPHR-Timer expires;
  upon configuration or reconfiguration of the power headroom reporting functionality by upper layers, which is not used to disable the function;
  activation of an SCell with configured uplink.
  prohibitPHR-Timer expires or has expired, when the UE has UL resources for new transmission, and the following is true in this TTI for any of the activated serving cells with configured uplink: there are UL resources allocated for transmission or there is a PUCCH transmission on this cell, and the required power backoff due to power management (as allowed by P-MPR$_c$) for this cell has changed more than dl-PathlossChange dB since the last transmission of a PHR when the UE had UL resources allocated for transmission or PUCCH transmission on this cell.

If the UE has UL resources allocated for new transmission for this TTI:
  1> if it is the first UL resource allocated for a new transmission since the last medium access control (MAC) reset, start periodicPHR-Timer;
  1> if the power headroom reporting procedure determines that at least one PHR has been triggered and not cancelled, and;
  1> if the allocated UL resources can accommodate a PHR MAC control element plus its subheader if extendedPHR is not configured, or the extended PHR MAC control element plus its subheader if extendedPHR is configured, as a result of logical channel prioritization:
    2> if extendedPHR is configured:
      3> for each activated serving cell with configured uplink:
        4> obtain the value of the type 1 power headroom;
        4> if the UE has UL resources allocated for transmission on this serving cell for this TTI:
          5> obtain the value for the corresponding $P_{CMAX,c}$ field from the physical layer;
      3> if simultaneousPUCCH-PUCCH is configured:
        4> obtain the value of the type 2 power headroom for the PCell;
        4> if the UE has a PUCCH transmission in this TTI:
          5> obtain the value for the corresponding $P_{CMAX,c}$ field from the physical layer;
      3> instruct the multiplexing and assembly procedure to generate and transmit an extended PHR MAC control element based on the values reported by the physical layer;
    2> else:
      3> obtain the value of the type 1 power headroom from the physical layer;
      3> instruct the multiplexing and assembly procedure to generate and transmit a PHR MAC control element based on the value reported by the physical layer;
    2> start or restart periodicPHR-Timer;
    2> start or restart prohibitPHR-Timer;
    2> cancel all triggered PHR(s).

A power headroom MAC control element (CE) and an extended power headroom MAC CE are described. It may be referred to Section of 6.3.1.6 of 3GPP TS 36.321 V11.3.0 (2013-06).

The power headroom MAC CE is identified by a MAC protocol data unit (PDU) subheader with logical channel identifier (LCID) having a value of 11010. It has a fixed size and consists of a single octet.

Figure 8:
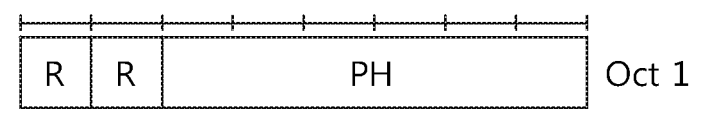

FIG. 8 shows a power headroom MAC CE. Referring to FIG. 8, the power headroom MAC CE defined as follows:

R: reserved bit and set to "0".

PH: this field indicates the power headroom level. The length of the field is 6 bits. The reported PH and the corresponding power headroom levels are shown in Table 1 below.

TABLE 1

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

The extended power headroom MAC CE is identified by a MAC PDU subheader with LCID having a value of 11001. It has a variable size.

FIG. 9 shows an extended power headroom MAC CE. Referring to FIG. 9, when Type 2 PH is reported, the octet containing the type 2 PH field is included first after the octet indicating the presence of PH per sCell and followed by an octet containing the associated $P_{CMAX,c}$ field (if reported). Then follows in ascending order based on the ServCellIndex an octet with the type 1 PH field and an octet with the associated $P_{CMAX,c}$ field (if reported), for the PCell and for each SCell indicated in the bitmap.

The extended power headroom MAC CE is defined as follows:

$C_i$: this field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported.

R: reserved bit, set to "0".

V: this field indicates if the PH value is based on a real transmission or a reference format. For type 1 PH, V=0 indicates real transmission on PUSCH and V=1 indicates that a PUSCH reference format is used. For type 2 PH, V=0 indicates real transmission on PUCCH and V=1 indicates that a PUCCH reference format is used. Furthermore, for both type 1 and type 2 PH, V=0 indicates the presence of the octet containing the associated $P_{CMAX,c}$ field, and V=1 indicates that the octet containing the associated $P_{CMAX,c}$ field is omitted.

PH: this field indicates the power headroom level. The length of the field is 6 bits. The reported PH and the corresponding power headroom levels are shown in Table 1 described above.

P: this field indicates whether the UE applies power backoff due to power management (as allowed by P-MPR$_c$). The UE shall set P=1 if the corresponding $P_{CMAX,c}$ field would have had a different value if no power backoff due to power management had been applied.

$P_{CMAX,c}$: if present, this field indicates the $P_{CMAX,c}$ or $P_{CMAX,c}$ used for calculation of the preceding PH field. The reported $P_{CMAX,c}$ and the corresponding nominal UE transmit power levels are shown in Table 2.

TABLE 2

| $P_{CMAX,c}$ | Nominal UE transmit power level |
| --- | --- |
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

Hereinafter, a method for transmitting a power headroom according to embodiments of the present invention is described. An embodiment of the present invention may consider a case where inter-site carrier aggregation is used for a UE. Inter-site carrier aggregation may be defined as that a UE is configured with multiple carriers where at least two carriers are associated with separate eNBs which may be connected by ideal backhaul or non-ideal backhaul. When a UE can perform simultaneous two UL transmissions (including PUSCH/PUCCH), the following cases may be considered.

Case 1: FDD+FDD or same DL/UL configuration TDD+TDD over idea backhaul

Case 2: FDD+FDD or same DL/UL configuration TDD+TDD over non-idea backhaul

Case 3: FDD+TDD or different DL/UL configuration TDD+TDD over ideal backhaul

Case 4: FDD+TDD or different DL/UL configuration TDD+TDD over non-ideal backhaul When a UE cannot be able to perform simultaneous two UL transmissions, the following cases may be considered.

Case 5: FDD+FDD or same DL/UL configuration TDD+TDD over idea backhaul

Case 6: FDD+FDD or same DL/UL configuration TDD+TDD over non-idea backhaul

Case 7: FDD+TDD or different DL/UL configuration TDD+TDD over ideal backhaul

Case 8: FDD+TDD or different DL/UL configuration TDD+TDD over non-ideal backhaul Hereinafter, for the convenience, a case where more than one carrier group is configured by a single eNB where each carrier group may have a carrier receiving PUCCH is called "PUCCH offloading". Each carrier group may have multiple carriers, even though the number of PUCCH carrier may be limited to only one per carrier group.

According to an embodiment of the present invention, power headroom may be calculated per CC, and all calculated power headroom may be reported to two eNBs. In addition to power headroom for each CC, eNBs may exchange its configured $P_{CMAX,eNBj}(i)$ with each other or the UE may inform the value to other eNB. When the UE configured with more than one $P_{CMAX,c}(i)$, power headroom may be calculated per each configured $P_{CMAX,c}(i)$ and then may be reported to eNBs. More specifically, if the UE is configured with more than one maximum power usable for more than one subsets of subframes where the maximum power value is applied per each subset of subframe, power headroom may be calculated using the maximum power assigned to that specific subframe and may be reported. Additionally, more than one values with all configured maximum powers may be reported as well. Alternatively, one power headroom may be reported depending on where the PHR has been triggered. For example, if PHR is triggered at a subframe with low power configured, low power may be used for calculating PHR. If PHR is triggered at a subframe with high power configured, higher power may be used for calculating PHR.

When PHR is calculated, whether to use $P_{CMAX,c}(i)$ or $P_{CMAX,eNBj}(i)$ as a maximum power per carrier may be considered. One option is to use $P_{CMAX,c}(i)$ regardless of $P_{CMAX,eNBj}(i)$ such that each eNB knows the power budget regardless of the allocated power for each eNB. This would be useful when power is shared between two eNBs, yet, power scaling may be occurred within a carrier group only per the allocated power. Alternatively, min $\{P_{CMAX,c}(i), P_{CMAX,eNBj}(i)\}$ may be used to calculate PHR. In this case, this may limit the amount of power increased from an eNB perspective. Thus, this may be more aligned with approach where power scaling/limit is determined per carrier group and unused power may be used by the other eNB. Another alternative is to use $P_{CMAX}$ regardless of $P_{CMAX,c}(i)$ or $P_{CMAX,eNBj}(i)$ such that each eNB knows how much power has been actually allocated to each carrier.

In detail, for each option, PHR reporting behaves as follows. Assuming that the UE reports PHR on all activated carrier with UL configured, it will be further assumed that for carrier where PUCCH is transmitted, type 2 PHR reporting is mandated regardless of PUCCH/PUSCH simultaneous transmission capability/configurability. However, this may be applied to a case where type 2 PHR reporting is not mandated or not used.

1) Option 1: Use $P_{CMAX,c}(i)$—This value may be used to calculate PHR. This may correspond to the current specification described above.

2) Option 2: Use $P_{CMAX,eNBj}(i)$—instead of $P_{CMAX,c}$, this value may be used to calculate PHR. However, since the eNB can estimate the PHR between $P_{CMAX,eNBj}(i)$ and accumulated power based on $P_{CMAX,c}(i)$, this option is not desirable. One way to estimate PHR for $P_{CMAX,eNBj}(i)$ may be that "PHR+$\{P_{CMAX,eNBj(i)}-P_{CMAX,c}\}$" where two values are higher layer configured.

3) Option 3: Use $P_{CMAX}$—this may be similar to option 2. This value can be calculated using PHR based on $P_{CMAX,c}(i)$.

Thus, overall, it is desirable to use $P_{CMAX,c}(i)$ for calculating PHR.

Another approach of reporting power headroom in a dual connectivity scenario is to define new reporting class, namely, class A and class B. The class A may be determined based on the assumption that simultaneous uplink transmission occur between two connections. The class B may be determined based on the assumption that only one uplink transmission occurs to the serving cell. For example, if FDD and TDD carriers are aggregated, and then one value of $P_{CMAX,c}$ is configured for each serving cell, to manage different uplink subframes where potentially only one uplink transmission occurs because TDD configuration defines downlink subframe in that specific time frame and some other subframes can potentially have two or more simultaneous uplink transmissions, different power headroom reporting classes may be specified. If this is used, it may be also considered to use two (or more) independent uplink power control loops. When more than two carriers are aggregated, the class A and B may be determined only between PCell and super SCell.

Assuming a scenario that more than one eNBs configure inter-node resource aggregation for a UE, it may be assumed that the UE reports PHR of each configured serving cell configured by an eNB to the eNB respectively. For example, two eNBs, i.e., eNB1 and eNB2, configure CC1, CC2 and CC3, CC4 respectively. The UE then reports PHR of CC1 and CC2 to the eNB1 and CC3 and CC4 to the eNB2 respectively. When the UE calculates the PHR, the measured maximum power may be calculated in consideration of other eNBs.

One example of calculating $P_{CMAX}$ would be to subtract power used for the other eNB (sum of PUSCH power to CCs configured by the other eNB) as shown in Equation 8 below.

$$\tilde{P}_{CMAX,c}(i) = \tilde{P}_{CMAX,c}(i) - \sum_{j \neq c} \hat{P}_{PUSCH,j}(i) \qquad <\text{Equation 8}>$$

Or, only PUSCH power to super SCell may be extracted in calculating the maximum power. If the other eNB cannot schedule uplink (e.g., configured as downlink subframe in the given subframe), the subframe would not be occurred. Thus, depending on where the PHR is reported (and calculated), serving eNB may estimate maximum power configurable per subframe configuration.

Another approach of reporting power headroom in a dual connectivity scenario is to configure one or more than one PHR configurations per each eNB or each carrier group. Power headroom is calculated for all activated with uplink configured per each instance of PHR reporting. In other words, the calculated power headroom for each carrier may be transmitted to both eNBs. Calculated PHR may be reported to each eNB following individual configuration.

Table 3 shows change of power headroom.

TABLE 3

| | Simultaneous PUCCH/PUSCH | PCell | SCell |
|---|---|---|---|
| (T1, $P_{CMAX}$ Real), (T1, $P_{CMAX}$) | No, No | PUSCH | x |
| (T1, $P_{CMAX}$ Real), (T1, $P_{CMAX}$), (T2, $P_{CMAX}$), (T2, $P_{CMAX}$) | Yes, Yes | PUSCH | x |
| (T1, $P_{CMAX}$ Real), (T1, $P_{CMAX}$ Real) | No, No | PUSCH | PUSCH |
| (T1, $P_{CMAX}$ Real), (T1, $P_{CMAX}$ Real) (T2, $P_{CMAX}$), (T2, $P_{CMAX}$) | Yes, Yes | PUSCH | PUSCH |
| (T1, $P_{CMAX}$), (T1, $P_{CMAX}$) | No, No | PUCCH | x |
| (T1, $P_{CMAX}$), (T1, $P_{CMAX}$), (T2, $P_{CMAX}$ Real), (T2, $P_{CMAX}$) | Yes, Yes | PUCCH | x |
| (T1, $P_{CMAX}$), (T1, $P_{CMAX}$ Real) | No, No | PUCCH | PUSCH |
| (T1, $P_{CMAX}$ Real), (T1, $P_{CMAX}$) (T2, $P_{CMAX}$), (T2, $P_{CMAX}$) | Yes, Yes | PUSCH | PUCCH |

Indicating actual transmission of PUCCH or PUSCH (or indication of real $P_{CMAX}$ or virtual $P_{CMAX}$ when reporting to higher layer for serving cell) may be necessary when aggregated PHRs are reported to both eNBs for all activated cells with uplink configured. To minimize the occurrence where the UE reports virtual $P_{CMAX}$ (i.e., assuming no MPR), it may be assumed that when there is no PUSCH or PUCCH scheduled at a subframe where the reporting occurs, the UE may assume that a default configuration is used for PUSCH or PUCCH transmission (i.e., default resource allocation is assumed to calculate maximum power) and the UE may report PHR and the calculated $P_{CMAX}$ for each serving cell.

For each carrier where PUCCH can be transmitted, type 1 PH and type 2 PH may be generated depending on PUCCH/PUSCH simultaneous transmission configuration.

When PHRs are reported for both eNBs for all activated carriers, there are cases where type 1 PH is reported with virtual $P_{CMAX}$ (i.e., based on not accounting for actual schedule and MPR values) when PUCCH transmission occurs only in a carrier. As virtual $P_{CMAX}$ becomes unclear considering the allocated/used power to PUCCH to the second eNB which does not have any scheduling information of the first eNB, at least, the flag to indicate whether PUCCH has been transmitted or not may be added such that the second eNB knows how the power headroom is calculated for the first eNB.

Or, when dual connectivity is configured, regardless of PUCCH/PUSCH simultaneous transmission capability and/or regardless of whether simultaneous PUCCH/PUSCH transmission is configured or not, the UE may be requested to report both type 1 PH and type 2 PH for at least carriers which can transmit PUCCH. More specifically, this may be applied for carriers configured by the first eNB when power headroom is reported to the second eNB. Likewise, this may be applied for carriers configured by the second eNB when power headroom is reported to the first eNB.

Figure 10:
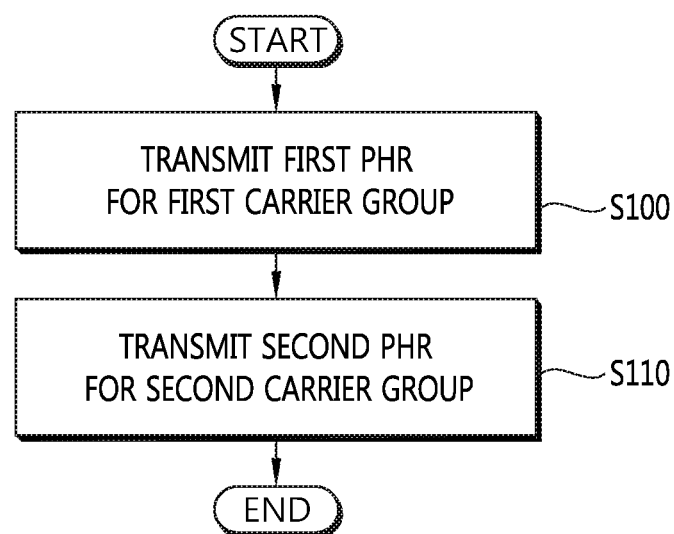
FIG. 10 shows an example of a method for transmitting a PHR according to an embodiment of the present invention.

FIG. 10 shows an example of a method for transmitting a PHR according to an embodiment of the present invention. In step S100, the UE transmits a first PHR for a first carrier group to a second carrier group. In step S110, the UE transmits a second PHR for the second carrier group to the first carrier group. The first PHR transmitted to the second carrier group and the second PHR transmitted to the first carrier group may include a PHR for PUSCH transmission (i.e., type 1 PHR) and a PHR for PUCCH transmission (i.e., type 2 PHR) regardless of whether simultaneous transmission of PUCCH/PUSCH is configured or not in dual connectivity and/or multiple carrier groups. That is, PHR for carriers configured by the second eNB which are transmitted to the first eNB may be based on both type 1 PHR and type 2 PHR, regardless of the configuration of PUCCH/PUSCH simultaneous transmission in carrier group of the second eNB and/or regardless of the UE capability to support PUCCH/PUSCH simultaneous transmission capability. PHR for carriers configured by the first eNB which are transmitted to the first eNB and PHR for carriers configured by the second eNB which are transmitted to the second eNB may be based on only type 1 PHR according to the current specification. The UE may further transmit $P_{CMAX,c}$ which is configured UE transmit power for serving cell c. The first carrier group may correspond to an MeNB in dual connectivity, and the second carrier group may correspond to an SeNB in dual connectivity. The first carrier group may include a plurality of CCs, and the second carrier group includes a plurality of CCs.

If the UE actually transmits PUCCH in a specific cell, the UE may further transmit an indication which indicates that the PHR/$P_{CMAX,c}$ corresponds to the PUCCH transmission or that PUCCH is actually transmitted. If the UE reduces transmission power of PUCCH/PUSCH in a specific cell due to transmission of other cells, the UE may further transmit an indication indicating that fact. One candidate is to trigger PHR so that it can give very minimum power headroom value or even negative power headroom value to eNBs.

It is also considered to trigger PHR when power related configuration occurs. For example, if the MeNB configures power split between the MeNB and SeNB, the UE may be triggered with PHR reporting so that it may report the usable PHR value properly. Further, regardless of power configuration, when the SeNB configures (or after successful connection with the SeNB), the UE may also reports PHR. This implies that when the MeNB configures pSCell (PUCCH cell on SCG), the UE may report PHR. Besides, when the SeNB and/or MeNB activate a carrier, PHR may be triggered.

Figure 11:
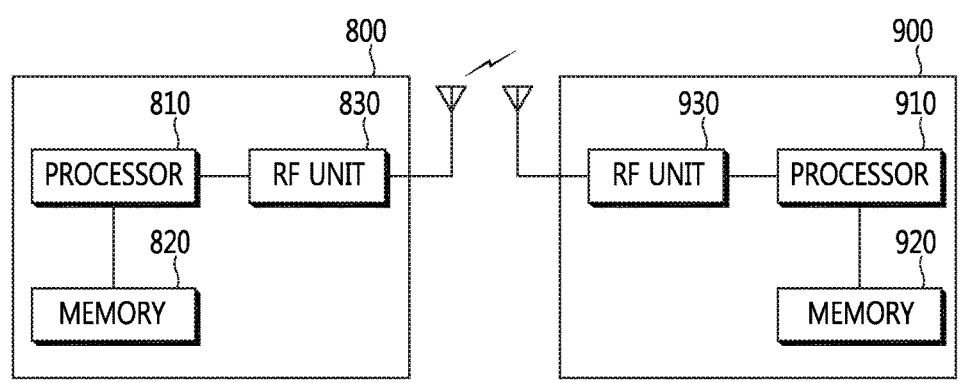
FIG. 11 is a block diagram showing wireless communication system to implement an embodiment of the present invention.

FIG. 11 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for operating a user a user equipment (UE) in a wireless communication system with dual connectivity, the method comprising:
    transmitting a type 1 power headroom for all activated carriers of a first base station and a second base station to the first base station; and
    transmitting a type 2 power headroom for a carrier which can transmit a physical uplink control channel (PUCCH) for the second base station to the first base station,
    wherein the UE is connected to both the first base station and the second base station in the dual connectivity.

2. The method of claim 1, wherein the type 2 power headroom is always transmitted regardless of whether simultaneous transmission of the PUCCH for the second base station and a physical uplink shared channel (PUSCH) for the second base station is configured or not.

3. The method of claim 1, wherein the first base station is a master node in the dual connectivity, and
wherein the second base station is a secondary node in the dual connectivity.

4. The method of claim 1, wherein the first base station is a secondary node in the dual connectivity, and
wherein the second base station is a master node in the dual connectivity.

5. The method of claim 1, wherein the UE is configured with simultaneous transmission of a PUCCH for the first base station and a PUSCH for the first base station.

6. The method of claim 5, further comprising:
transmitting a type 2 power headroom for a carrier which can transmit the PUCCH for the first base station to the first base station.

7. The method of claim 1, further comprising:
transmitting $P_{CMAX,c}$, which is configured UE transmit power for serving cell, to the first base station.

8. The method of claim 1, further comprising:
transmitting an indicator, which indicates that the carrier for which the type 2 power headroom is transmitted actually transmits the PUCCH for the second base station, to the first base station.

9. A user equipment (UE) in a wireless communication system with dual connectivity, the UE comprising:
a memory;
a radio frequency (RF) unit; and
a processor, operably coupled to the memory and the RF unit, that controls the RF unit to:
transmit a type 1 power headroom for all activated carriers of a first base station and a second base station to the first base station, and
transmit a type 2 power headroom for a carrier which can transmit a physical uplink control channel (PUCCH) for the second base station to the first station,
wherein the UE is connected to both the first base station and the second base station in the dual connectivity.

10. The UE of claim 9, wherein the type 2 power headroom is always transmitted regardless of whether simultaneous transmission of the PUCCH for the second base station and a physical uplink shared channel (PUSCH) for the second base station is configured or not.

11. The UE of claim 9, wherein the first base station is a master node in the dual connectivity, and
wherein the second base station is a secondary node in the dual connectivity.

12. The UE of claim 9, wherein the first base station is a secondary base in the dual connectivity, and
wherein the second base station is a master node in the dual connectivity.

13. The UE of claim 9, wherein the UE is configured with simultaneous transmission of a PUCCH for the first base station and a PUSCH for the first base station.

14. The UE of claim 13, wherein the processor controls the RF unit to transmit a type 2 power headroom for a carrier which can transmit the PUCCH for the first eNB to the first base station.

15. The UE of claim 9, wherein the processor controls the RF unit to transmit $P_{CMAX,c}$, which is configured UE transmit power for serving cell, to the first base station.

16. The UE of claim 9, wherein the processor controls the RF unit to transmit an indicator, which indicates that the carrier for which the type 2 power headroom is transmitted actually transmits the PUCCH for the second eNB, to the first base station.

* * * * *